United States Patent [19]

Sasanuma et al.

[11] Patent Number: 5,258,783
[45] Date of Patent: Nov. 2, 1993

[54] IMAGE PROCESSING METHOD AND APPARATUS WITH GAMMA-CORRECTION CONTROL

[75] Inventors: Nobuatsu Sasanuma, Yamato; Koji Amemiya, Tokyo; Tatsuo Takeuchi, Kawasaki; Takao Ogata, Yokohama, all of Japan

[73] Assignee: Canon Kabushiki Kaisha, Tokyo, Japan

[21] Appl. No.: 839,166

[22] Filed: Feb. 21, 1992

[30] Foreign Application Priority Data

Feb. 22, 1991 [JP] Japan .................................. 3-28614

[51] Int. Cl.⁵ ..................... G01D 15/00; H04N 1/21; G03F 3/08
[52] U.S. Cl. .................................. 346/157; 346/160; 358/519
[58] Field of Search ............... 355/214, 246; 346/157, 346/160; 358/302, 80

[56] References Cited

U.S. PATENT DOCUMENTS

| | | | |
|---|---|---|---|
| 4,888,636 | 12/1989 | Abe | 358/80 |
| 4,963,898 | 10/1990 | Kadowaki et al. | 346/157 |
| 5,057,913 | 10/1991 | Nagata et al. | 358/302 |
| 5,061,949 | 10/1991 | Ogino et al. | 346/160 |

*Primary Examiner*—Fred L. Braun
*Attorney, Agent, or Firm*—Fitzpatrick, Cella, Harper & Scinto

[57] ABSTRACT

An image processing apparatus, which improves the image quality in gradation control, measures the density of a specified gradation pattern formed on a photosensitive drum with a photosensor and prepares a look-up table for gamma correction, based on thus measured density. Formation of a pseudo-contour is prevented by control of the inclination of the gamma correction curve represented by the data of the look-up table.

16 Claims, 10 Drawing Sheets

IMAGE PROCESSING METHOD AND APPARATUS WITH GAMMA-CORRECTION CONTROL

BACKGROUND OF THE INVENTION

1. Field of the Invention

The present invention relates to an image processing apparatus for processing a monochromatic image with gradation or a color image.

2. Related Background Art

There is already known a method for stabilizing image, as disclosed in U.S. Pat. No. 4,888,636 and U.S. patent application Ser. No. 07/760,505, filed Sep. 16, 1991, by forming a characteristic pattern on an image bearing member, reading the density of said pattern and effecting feedback control on the supply amount of toner or on the image forming conditions based on the thus obtained density.

However, such conventional method is associated with a drawback that the faithful feedback of the read pattern density on the image forming conditions may result, depending on the control amount, in a discontinuity in gradation.

More specifically, in the preparation of a tonal correction table, if the density slope is too steep in the low density area, pseudo-contour is generated in a highlight area such as a human skin.

Also there has not been an apparatus that allows the operator to easily recognize the correction characteristics in the tonal correction.

SUMMARY OF THE INVENTION

An object of the present invention is to provide an image processing apparatus capable of preventing deterioration in image quality.

The above-mentioned object can be attained, according to the present invention, by an image processing apparatus comprising memory means for storing pattern data; pattern forming means for forming a visible pattern on a recording medium utilizing said pattern data; detecting means for detecting the density of said visible pattern; and calculating means for calculating the inclination of a gamma-correction curve, based on the density detected by said detecting means.

Another object of the present invention is to provide a novel method for determining the gamma-correction curve.

The above-mentioned object can be attained, according to the present invention, by an image processing apparatus comprising memory means for storing pattern data; pattern forming means for forming a visible pattern on a recording medium utilizing said pattern data; detecting means for detecting the density of said visible pattern; comparing means for comparing the inclination of a gamma-correction curve to be determined according to the density detected by said detecting means with a predetermined value; and determining means for determining a gamma-correction curve according to the result of comparison by said comparing means.

Still another object of the present invention is to provide an image processing apparatus with excellent operability and easy maintenance.

The above-mentioned object can be attained, according to the present invention, by an image processing apparatus comprising memory means for storing pattern data; pattern forming means for forming a visible pattern on a recording medium utilizing said pattern data; detecting means for detecting the density of said visible pattern; calculating means for calculating the inclination of a gamma-correction curve to be determined by the density detected by said detecting means; and display means for displaying information relates to the result of calculation by said calculating means.

Still another object of the present invention is to provide an image processing apparatus capable of optimizing the image forming state within said apparatus itself.

Still another object of the present invention is to reproduce a color image efficiently and with high image quality.

Still other objects of the present invention, and the embodiments thereof, will become fully apparent from the following description to be taken in conjunction with the attached drawings, and also from the appended claims.

DETAILED DESCRIPTION OF THE PREFERRED EMBODIMENTS

Embodiment 1

Now the present invention will be clarified in detail by an embodiment thereof.

Figure 1:
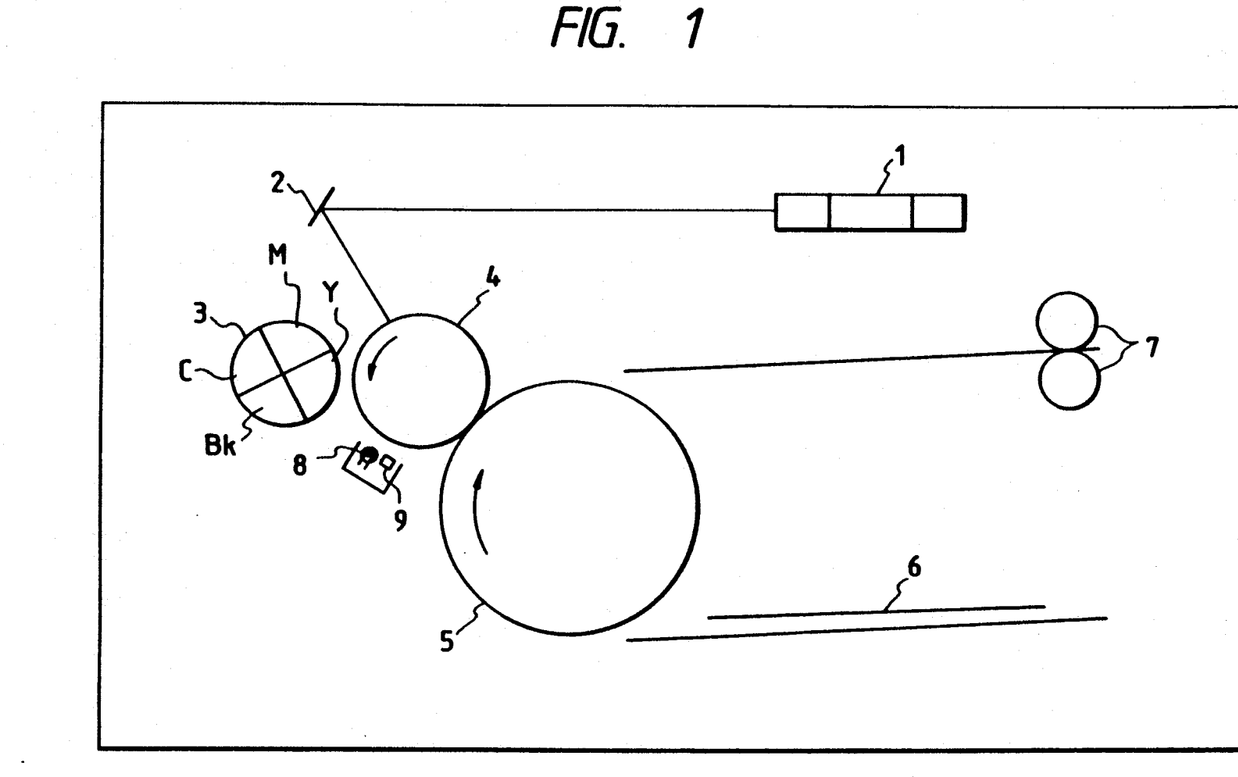
FIG. 1 is a schematic view of an embodiment (embodiment 1) of the present invention.

FIG. 1 illustrates an embodiment of the present invention, in which the image signal is converted by a laser driver and a laser unit (both not shown) into a laser beam. The laser beam is reflected by a polygonal mirror 1 and a mirror 2 and irradiates a photosensitive drum 4.

The drum 4, bearing a latent image formed by the scanning with the laser beam, rotates in a direction indicated by an arrow, and the latent image is developed in each color by a rotary developing unit 3. (FIG. 1 illustrates a state in which development with yellow tone is being performed.

A transfer sheet 6 is wound on a transfer drum 5, which makes a full turn for each color, in the order of Y (yellow), M (magenta), C (cyan) and BK (black), whereby an image transfer is completed by 4 turns in total.

After the image transfer, the transfer sheet 6 is separated from the transfer drum 5 and is subjected to fixation by paired fixing rollers 7, whereby a color image print is completed.

A light-emitting diode (LED) 8 emits near infrared light (main wavelength at ca. 960 nm), and a sensor 9 reads said light reflected by the photosensitive drum.

Figure 2:
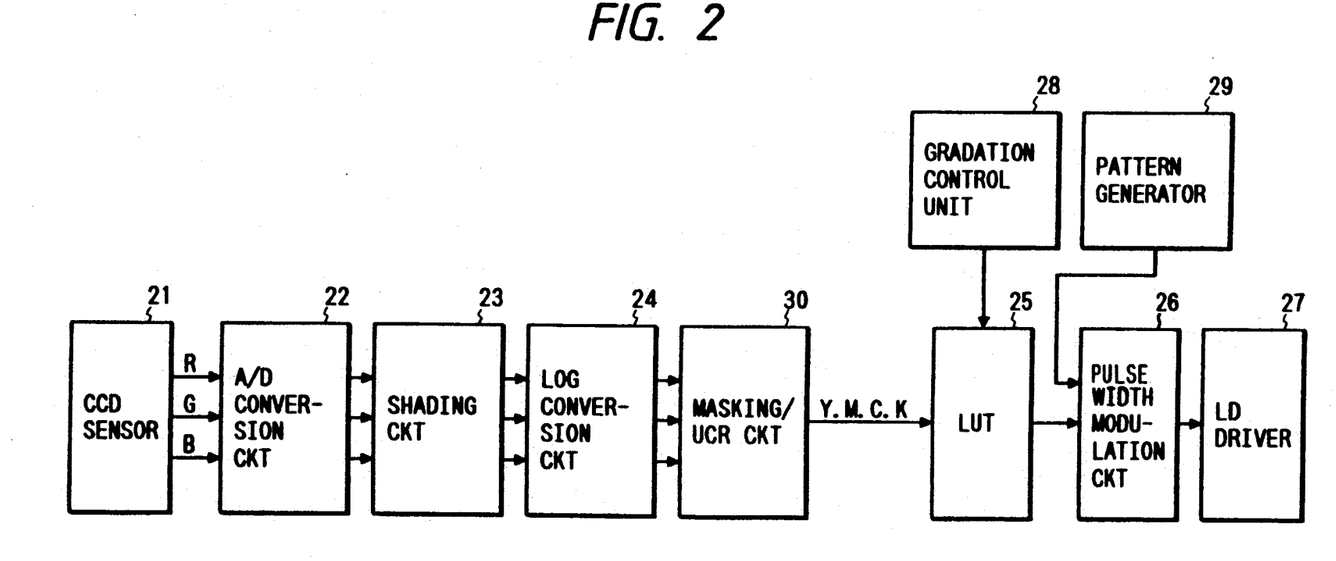
FIG. 2 is a block diagram of a circuit for processing electrical signals from a CCD.

FIG. 2 shows an image signal processing circuit employed in the present embodiment for obtaining an image with gradation.

Luminance signals of R (red), G (green) and B (blue) are obtained from an original image, by means of a three-color CCD line sensor 21, which serves to input image information, and are converted by an A/D conversion circuit 22 into digital luminance signals of R, G and B.

The digital luminance signals are subjected to the correction of sensitivity fluctuation of the CCD elements in a shading correction circuit 23, and the corrected luminance signals are converted by a logarithmic conversion circuit 24 into density signals, and then, in a masking-UCR circuit 30, into frame-sequential data of Y (yellow), M (magenta), C (cyan) and K (black) components.

The frame-sequential data are converted, in a look-up table (LUT) 25 for gradation correction (gamma-correction), in such a manner that the output image density coincides with the original image density, according to the gamma characteristics initially set in a printer. The LUT 25 is composed of a RAM, storing different gamma-correction curves, respectively corresponding to the Y, M, C and K colors.

The conversion (gamma-correction) characteristics of the LUT 25 are controlled, as will be explained later, by a gradation control unit 28, in order to resolve the drawbacks explained before. A pattern generator 29 generates a pattern signal, for forming a toner pattern for each color in cooperation with pulse width modulation circuit 26 via laser driver 27, as shown in FIG. 2.

Figure 3:
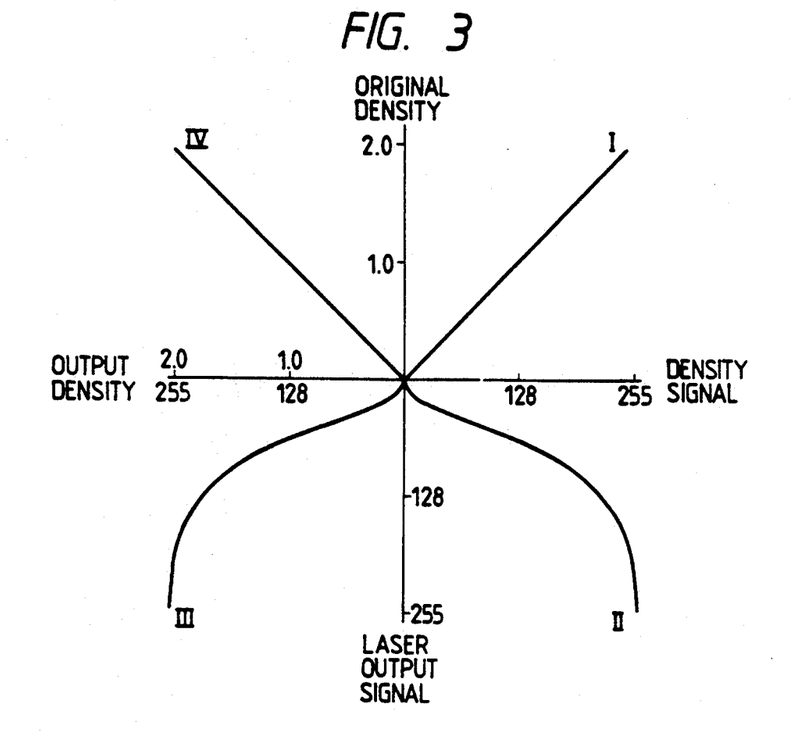
FIG. 3 is a 4-quadrant chart showing tonal reproduction characteristics.

FIG. 3 is a 4-quadrant chart showing the mode of gradation reproduction.

The quadrant I shows the reading characteristics of an image reader unit for converting the original image density into a density signal; the quadrant II shows the gamma-correction characteristics of the LUT 25 for converting the density signal into a laser output signal; the quadrant III shows the printer characteristics for converting the laser output signal into an output image density; and the quadrant IV shows the relation between the original image density and the output image density, corresponding to the total gradation characteristics of the image forming apparatus.

The gradation is given by 256 levels, as the data processing is conducted with 8-bit digital signals.

In this image forming apparatus, in order to obtain linear gradation characteristics in the quadrant IV, the printer characteristics in the quadrant III are corrected by the LUT 25 shown in the quadrant II.

The gamma-correction characteristics of the LUT 25 are determined by a calculation to be explained below.

After conversion by the LUT 25, the obtained signals are converted, by a pulse width modulation circuit 26, into signals corresponding to dot widths, and supplied to a laser driver 27 which drives the printer to form the output image. By the laser beam scanning on the photosensitive drum 4, there is formed a latent image with gradation represented by the change in dot area, and an image with gradation is obtained through the steps of image development, image transfer and image fixation.

The image forming apparatus is provided therein with a test pattern generator 29, which is composed for example of a ROM and generates a pattern of plural gradations for each of Y (yellow), M (magenta), C (cyan) and K (black) colors on the photosensitive drum 4.

Figure 4:
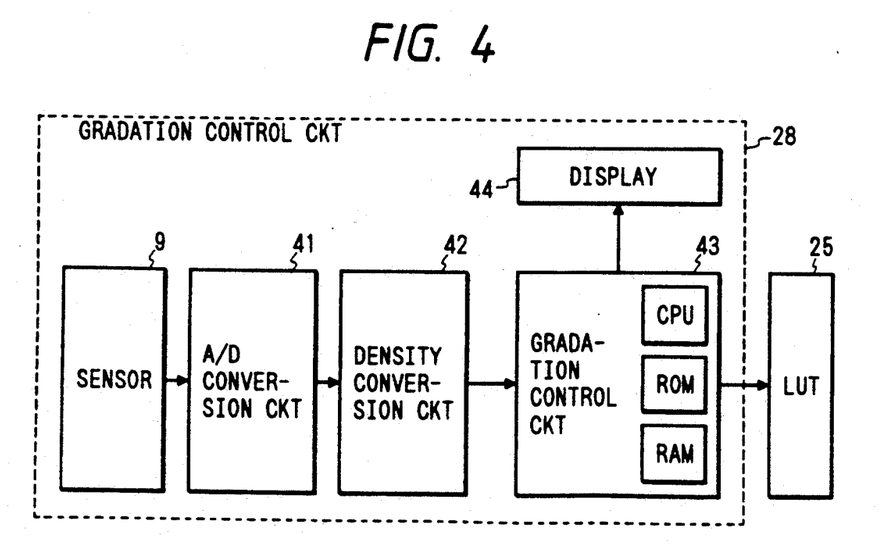
FIG. 4 is a block diagram of a circuit for processing electrical signals from a sensor 9.

FIG. 4 shows the structure of the gradation control unit 28 for controlling the gradation, utilizing a signal from the sensor 9 to detect the pattern density by reading the toner pattern formed on said drum 4. The near-infrared light entering the sensor 9 is converted therein to an analog electric signal, which is then converted into a digital signal by an A/D conversion circuit 41. The signal is further converted by a density conversion circuit 42 into a density signal, which is supplied to a gradation control circuit 43, which serves to determine the gamma-correction curve which will actually be used to output an image, as explained below. The circuit 43 is composed of a CPU, a ROM storing a program corresponding to a flow chart to be explained later, and a RAM. A display unit 44, such as a touch-panel display, serves to display information related to the inclination of the gamma-correction curve, such as a variation rate $\alpha$ to be explained later, or the result of comparison of said rate $\alpha$ with the threshold value.

The toners employed in the present embodiment are colored yellow, magenta and cyan, and are obtained by dispersing coloring materials of respective colors in a binder material composed of a styrene copolymer resin.

Figure 5:
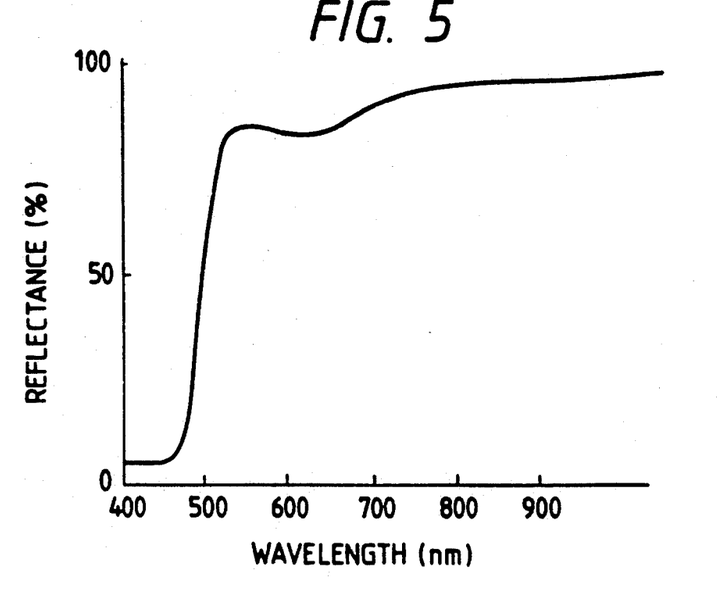
FIG. 5 is a chart showing an example of spectral characteristics of yellow toner.
Figure 6:
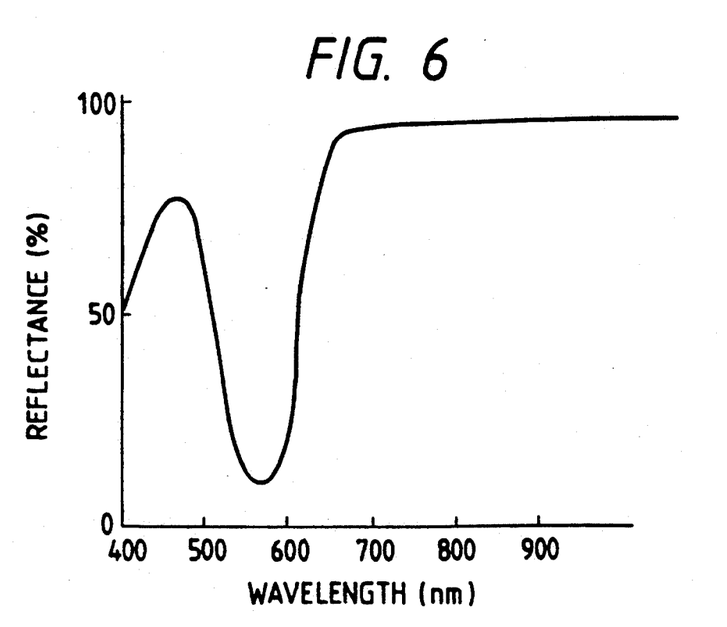
FIG. 6 is a chart showing an example of spectral characteristics of magenta toner.
Figure 7:
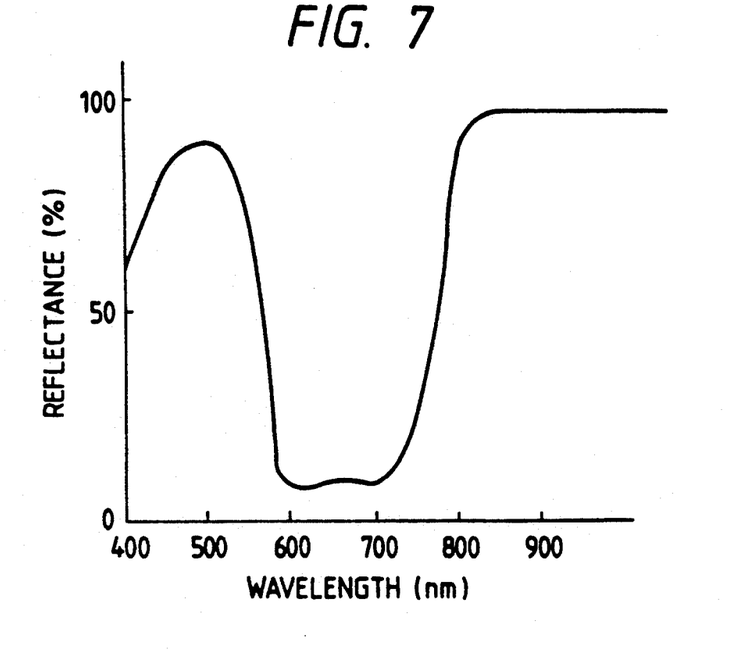
FIG. 7 is a chart showing an example of spectral characteristics of cyan toner.

The yellow, magenta and cyan toners, having spectral characteristics respectively shown in FIGS. 5 to 7, can provide a reflectance of at least 80% in the near-infrared region (for example at 960 nm). The image formation with these colored toners is conducted with 2-component development, which is advantageous in color purity and transmittance.

Figure 8:
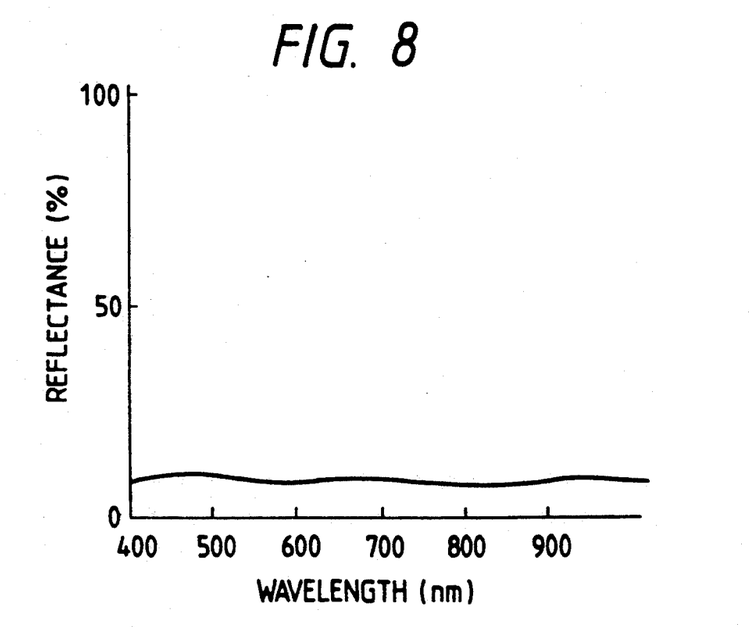
FIG. 8 is a chart showing an example of spectral characteristics of one-component magnetic black toner.

On the other hand, the black toner employed in the present embodiment is composed of one-component magnetic toner, which is already known to achieve a low running cost in monochromatic copying and has a reflectance of about 10% in the near-infrared region (for example at 960 nm) as shown in FIG. 8. Therefore the density measurement is rendered for yellow, magenta, cyan and black colors with a single light, by employing such near-infrared light and measuring the reflected light.

For the black toner, there is employed one-component jumping development, but there may also be employed two-component toner.

The photosensitive drum 4 is composed of an organic photoconductor with a reflectance of about 40% in the near-infrared region (for example at 960 nm), but there may also be employed a drum composed of amorphous silicon.

Figure 9:
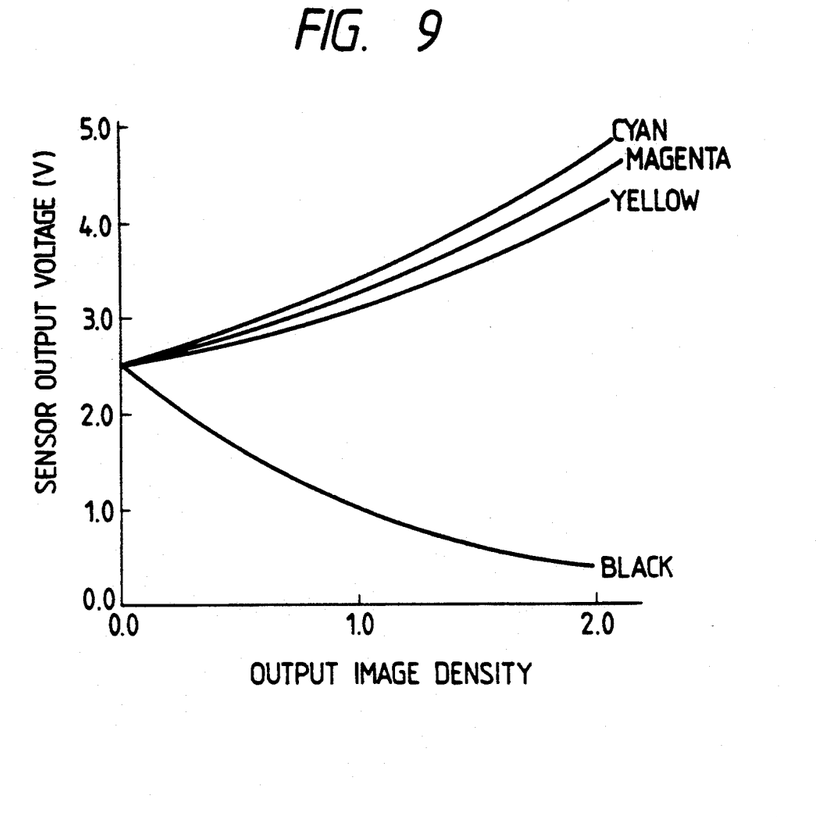
FIG. 9 is a chart showing an example of relation between density signal level and sensor output.

FIG. 9 shows the relationship between the output of the sensor 9 and the output image density, when the density on the drum 4 is varied by area modulation. The output of the sensor 9 is set at 2.5 V when the toner is not deposited on the drum 4. As shown in FIG. 9, the output of the sensor 9 increases as the area covering rate of the toner increases, for the yellow, magneta or cyan toner. On the other hand, for the black toner, the output of the sensor 9 decreases with the increase of the area covering rate.

These relationships allow one to precisely determine the output image density from the sensor output, without actual image transfer and fixation on the transfer sheet.

Figure 10:
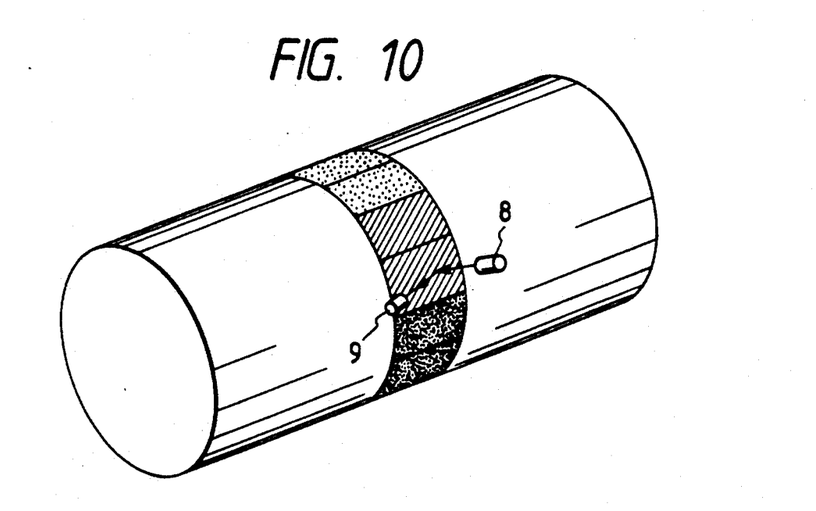
FIG. 10 is a view showing an example of the position for forming a specified gradation pattern patch.

Prior to the ordinary copying sequence, a pattern of specified gradations (in the present embodiment, a pattern of 10 levels of the laser output signal, at levels 16, 32, 48, 64, 80, 96, 112, 128, 144 and 160, was employed) is continuously formed along the periphery of the drum 4 as shown in FIG. 10, and is measured with the LED 8 and sensor 9 at a suitable timing. Thus the gradation characteristics, or the printer characteristics shown in the quadrant III in FIG. 3, can be determined from thus obtained density data, without actual image transfer and fixation on the copying sheet.

The LUT 25 for correcting the printer characteristics can be easily determined by inverting the input-output relationship of the characteristics.

In an electrophotographic copying apparatus, various properties are known to vary, according to the number of copies made. This is due to a variation in the photosensitive characteristics resulting from fatigue of the photosensitive member by light or surface scraping thereof by the cleaning blade, and also due to a variation in the frictional charging ability of the developer.

In the present embodiment, therefore, the above-explained operation is conducted periodically before the copying operation to renew the LUT 25, thereby constantly realizing optimum gradation reproducing characteristics.

However, in stabilizing the gradation characteristics through the control explained above, if the inclination of the gamma-correction curve exceeds a certain value, there may result a pseudo-contour (or false contour), a defect in the image, which is not negligible, particularly in the low density (highlight) area.

Figure 11:
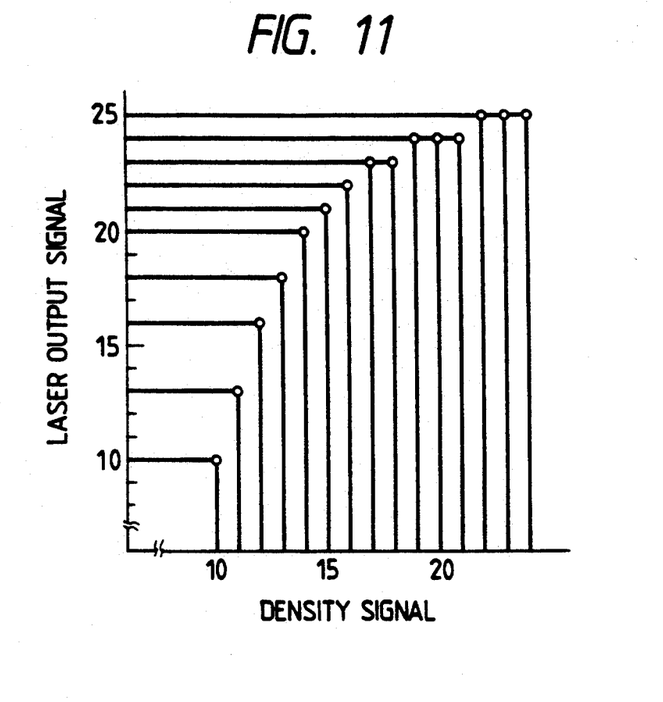
FIG. 11 is a chart showing a look-up table in partially magnified manner.

The pseudo-contour is an image defect appearing in case of a discontinuity in the gradation. Referring to FIG. 11 showing a part of the LUT in magnified manner, a density signal of level 10 corresponds to a laser output of level 10 while a density signal of level 11 corresponds to a laser output of level 13. With such difference of 3 levels in gradation, the laser outputs of levels 11 and 12 are not generated under these conditions. If such difference becomes large, the gradation becomes discontinuous, whereby a certain density area becomes particularly conspicuous in the image, thus generating a pseudo-contour around said area.

Figure 12:
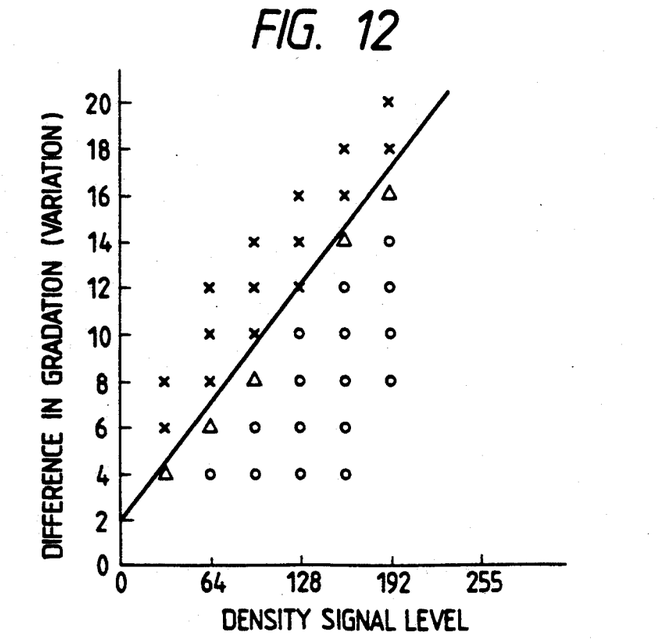
FIG. 12 is a chart showing the condition of pseudo contour generation.

FIG. 12 shows the relationship between the conversion characteristics of the LUT and the pseudo-contour, experimented by the present inventors and represented by the difference in gradation of the LUT in the ordinate and the density signal level in the abscissa.

A mark "○" indicates an image in which the pseudo contour was not observable; "△" indicates an image in which the pseudo contour was observable only under careful observation; and "×" indicates a pseudo-contour easily observable.

Based on these data, a solid line is provided as a boundary of formation of pseudo-contour.

As will be apparent from these data, the LUT has to be so designed that the difference in gradation (inclination of curve) is smaller in the shadow side than in the highlight side.

Figure 13:
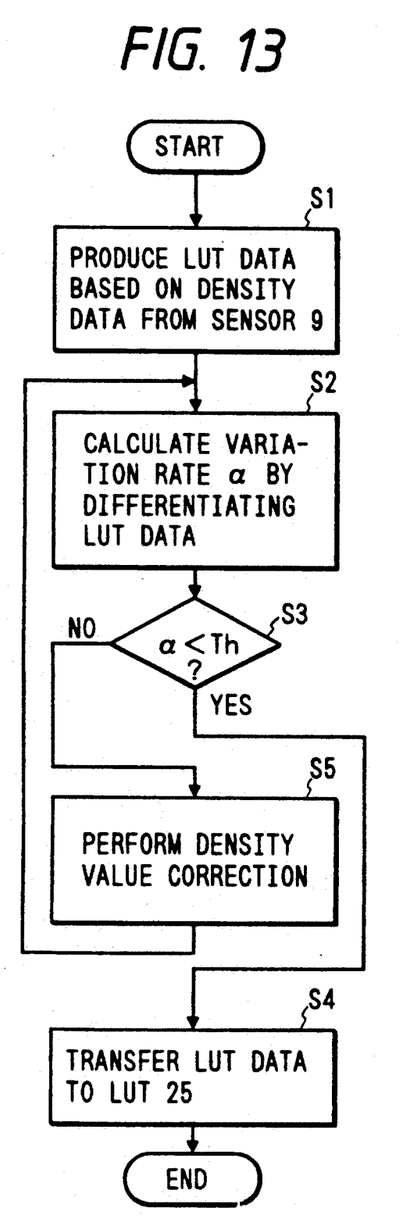
FIG. 13 is a flow chart of a sequence for correcting the look-up table in embodiment 1.

FIG. 13 is a flow chart showing the sequence of LUT preparation in the present embodiment.

At first a step S1 prepares the LUT data, based on the density data received from the sensor 9 and obtained by calculation. The data of the densities other than the aforementioned ten density levels are prepared by interpolation, for example first-order interpolation.

A step S2 determines the variation rate $\alpha$ of the output density to the input density, namely the information on the aforementioned difference in gradation, by differentiating the prepared LUT data. A step S3 discriminates whether said variation rate $\alpha$ is smaller than a predetermined threshold value Th, and, if smaller, a step S4 stores said LUT data in the RAM. On the other hand, if the variation rate is larger, a step S5 corrects the output density corresponding to the input density, and the step S2 is repeated.

As explained above, the LUT data prepared from the densities of 10 levels of the aforementioned specified pattern are converted, by differentiation, into the variation rate $\alpha$ of the output density with respect to the input density, or the information on the aforementioned difference in gradation. Then, only in a region where the variation rate exceeds the boundary of pseudo-contour generation shown in FIG. 14, the LUT data are prepared again by raising the read density, obtained from the light reflected from the specified pattern on the photosensitive drum, by one level, and there is discriminated whether the boundary of pseudo-contour generation is exceeded. In this manner, the correction is repeated until a condition not generating the pseudo-contour is reached, over the entire density range.

Use of such LUT, prepared in a feedback system in which the image forming conditions are optimized by reading an image formed by image forming means, avoids discontinuity in gradation, such as a pseudo-contour, which is a fatal defect in the image, thus providing satisfactory image quality.

Figure 17:
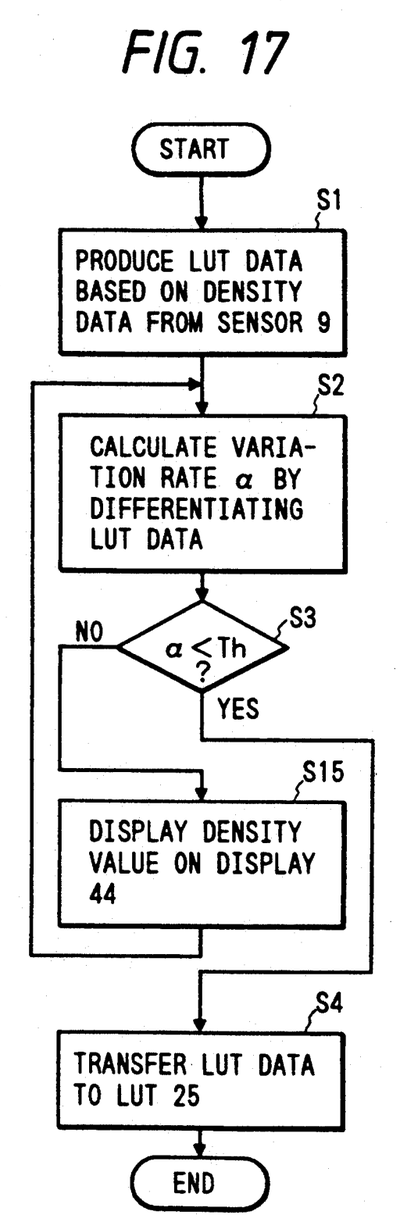
FIG. 17 is a flow chart showing a variation of embodiment 1 of the present invention.

FIG. 17 is a flow chart showing a variation of embodiment 1 of the present invention.

In this variation, if the variation rate $\alpha$ is equal to or higher than the threshold value Th, this fact or the value of the variation rate $\alpha$ is displayed on the display unit 44, without correction on the density (step S15). In such case, since the probability of pseudo-contour generation in the highlight area is high, the above-explained process is repeated for example after the replacement of the photosensitive drum 4 by the operator.

Embodiment 2

Figure 14:
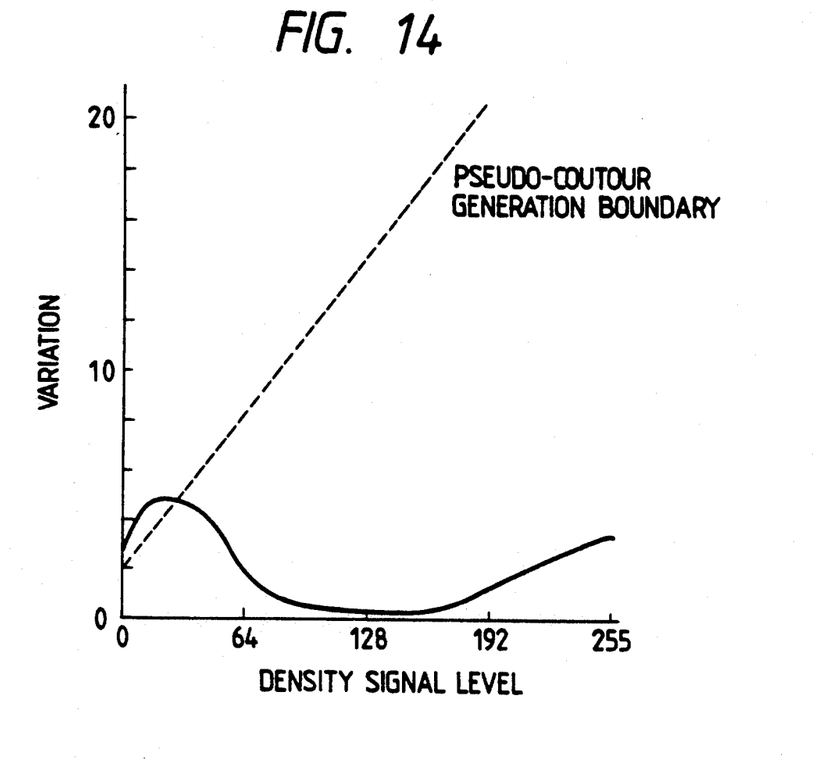
FIG. 14 is a chart showing the relation between the density signal level and the amount of variation in the look-up table.
Figure 15:
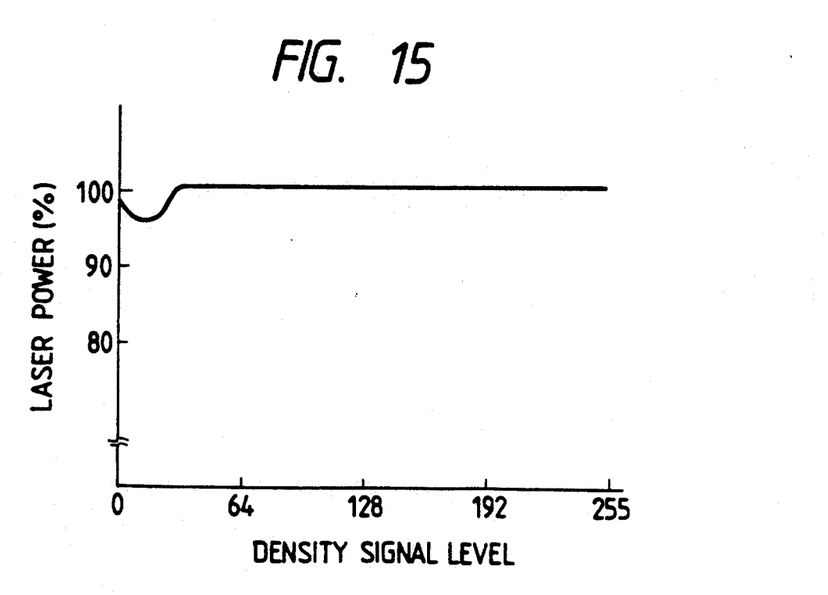
FIG. 15 is a chart showing an example of the relation between the density signal level and the laser power.

The false contour generation in FIG. 14 is based on a fact that the density is forcedly elevated by the correction. In the present embodiment, therefore, the laser output in the region of such false contour generation is rendered variable, as shown in FIG. 15, depending on the density signal.

Such control of output of the laser unit (not shown) according to the density level results in a certain density decrease in the highlight area, but the image as a whole becomes free from the fatal discontinuity in gradation, such as a pseudo-contour and is given satisfactory image quality.

Embodiment 3

The embodiment 1 is not advantageous in terms of effective speed and required memory capacity, because the algorithm for determining the LUT data is complex.

Figure 16:
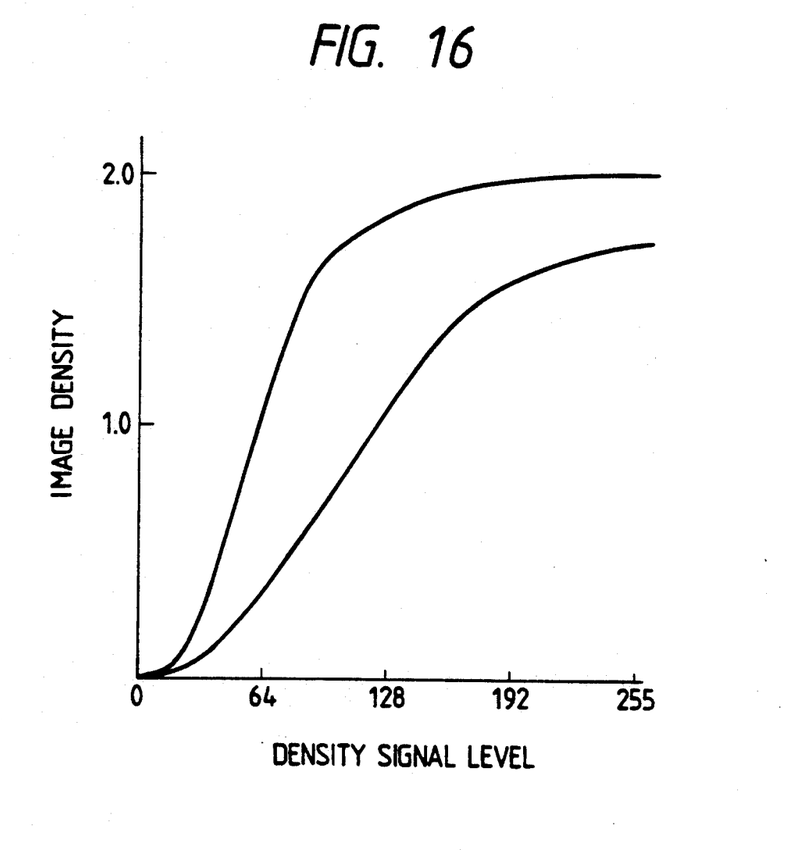
FIG. 16 is a chart showing an example of the relation between the density signal level and the image density.

In the actual apparatus, the printer characteristics are generally limited within a certain range. FIG. 16 shows the range of fluctuation of characteristics in the apparatus embployed in the present embodiments. It is therefore possible to define a density region where the pseudo-contour is likely to occur.

In the present embodiment there are employed a limiter which sets the density at the level 12 only when the density level, converted from the light intensity reflected from a pattern formed on the drum with a laser output signal of level 16, becomes equal to or less than level 12, and a limiter which sets the density at the level 24 only when the density level, converted from the light intensity reflected from a pattern formed with a laser output signal of level 32, becomes equal to or lower than level 24.

Use of such limiters avoids the fatal discontinuity in gradation, such as the pseudo-contour, and provides satisfactory image quality, as in the embodiment 1.

As explained in the foregoing, the embodiments of the present invention provide an effect of preventing defects in the formed image, in an image forming apparatus capable of improving the stability of image quality by self-judging the printer characteristics prior to a printing operation and effecting gradation control based on thus obtained characteristics, by limiting at least either of the gradation control region and the gradation control amount.

Therefore, the present invention allows one to prevent deterioration of image quality and to obtain a satisfactory image.

The present invention is not limited to the foregoing embodiments but is subject to various modifications within the scope and spirit of the appended claims.

What is claimed is:

1. An image processing apparatus comprising:
   input means for inputting image data;
   correcting means for correcting density characteristics of the image data by using a predetermined gamma-correction curve and outputting corrected image data;
   image forming means for forming an image on a medium based on the corrected image data;
   memory means for storing pattern data;
   pattern forming means for forming a visible pattern on the medium, utilizing the pattern data stored in said memory means;
   detecting means for detecting a density of the visible pattern formed on the medium; and
   determining means for determining the predetermined gamma-correction curve to be used by said correcting means according to the density of the visible pattern detected by said detecting means,
   wherein said determining means determines the predetermined gamma-correction curve by comparing an inclination of a candidate gamma-correction curve based on the density of the visible pattern with a predetermined value.

2. An apparatus according to claim 1, wherein said pattern forming means is adapted to form patterns for a plurality of color components.

3. An apparatus according to claim 1, wherein said detecting means includes means for emitting near-infrared light.

4. An apparatus according to claim 1, further comprising a look-up table storing the gamma-correction curves.

5. An apparatus according to claim 1, further comprising means for displaying information related to the inclination of the predetermined gamma-correction curve.

6. An image processing apparatus comprising:
   input means for inputting image data;
   correcting means for correcting density characteristics of the image data by using a predetermined gamma-correction curve and outputting corrected image data;
   image forming means for forming an image on a medium based on the corrected image data;
   memory means for storing pattern data;
   pattern forming means for forming a visible pattern on the pattern data stored in said memory means;
   detecting means for detecting a density of the visible pattern formed on the medium; and
   determining means for determining the predetermined gamma-correction curve to be used by said correcting means according to the density of the visible pattern detected by said detecting means,
   wherein said determining means further comprises:
      calculating means for calculating an inclination of a candidate gamma-correction curve according to the density detected by said detecting means, and
      display means for displaying information relating to a result of the calculation by said calculating means.

7. An apparatus according to claim 6, wherein said pattern forming means is adapted to form patterns for a plurality of color components.

8. An apparatus according to claim 6, wherein said detecting means further comprises means for emitting near-infrared light.

9. An apparatus according to claim 6, further comprising a look-up table storing the gamma-correction curves.

10. An image processing apparatus comprising:
    input means for inputting data;
    correcting means for correcting density characteristics of the image data by using a predetermined gamma-correction curve and outputting corrected image data;
    image forming means for forming an image on a medium based on the corrected image data;
    memory means for storing pattern data;
    pattern forming means for forming a visible pattern on the medium, utilizing the pattern data stored in said memory means;
    detecting means for detecting the density of the visible pattern; and
    determining means for determining the predetermined gamma-correction curve to be used by said correcting means according to the density of the visible pattern detected by said detecting means,
    wherein said determining means further comprises calculating means for calculating an inclination of a candidate gamma-correction curve according to the density detected by said detecting means.

11. An apparatus according to claim 10, wherein said pattern forming means is adapted to form patterns for a plurality of color components.

12. An apparatus according to claim 10, wherein said detecting means includes means for emitting near-infrared light.

13. An apparatus according to claim 10, further comprising a look-up table storing the gamma-correction curves 14. An image processing method for determining a gamma-correction curve for correcting density characteristics of input image data, comprising the steps of:
    generating pattern data;
    forming a visible pattern on a medium utilizing the pattern data;
    detecting a density of the visible pattern; and
    determining the gamma-correction curve according to the density of the visible pattern,
    wherein, in said determining step, the gamma-correction curve is determined by comparing an inclination of a candidate gamma-correction curve based on the density of the visible pattern with a predetermined value.

15. An image processing method for determining a gamma-correction curve for correcting density characteristics of input image data, comprising the steps of:
    generating pattern data;
    forming a visible pattern on a medium utilizing the pattern data;
    detecting a density of the visible pattern; and
    determining the gamma-correction curve according to the density of the visible pattern,
    wherein said determining step further comprises the steps of: calculating an inclination of a candidate gamma-correction curve according to the density thus detected, and displaying information relating to a result of the calculation performed in said calculating step.

16. An image processing method for determining a gamma-correction curve for correcting density characteristics of input image data, comprising the steps of:
    generating pattern data;
    forming a visible pattern on a medium utilizing the pattern data;
    detecting a density of the visible pattern; and
    determining the gamma-correction curve according to the density of the visible pattern,
    wherein said determining step further comprises the step of calculating an inclination of a candidate gamma-correction curve according to the density thus detected.

* * * * *

UNITED STATES PATENT AND TRADEMARK OFFICE
CERTIFICATE OF CORRECTION

PATENT NO. : 5,258,783

DATED : November 2, 1993

INVENTOR(S) : NOBUATSU SASANUMA, ET AL.

Page 1 of 2

It is certified that error appears in the above-indentified patent and that said Letters Patent is hereby corrected as shown below:

COLUMN 2

Line 43, "pseudo" should read --pseudo- --.

COLUMN 3

Line 5, "tone" should read --toner--.

COLUMN 5

Line 64, "pseudo" should read --pseudo- --.
Line 66, "pseudo contour" should read --pseudo-contour--.

COLUMN 6

Line 67, "pseudo-contour" should read --pseudo-contour,--.

COLUMN 7

Line 9, "embployed" should read --employed--.

COLUMN 8

Line 21, "on" should read --on the medium, utilizing--.

COLUMN 9

Line 6, "curves" should read --curves.--.

UNITED STATES PATENT AND TRADEMARK OFFICE
CERTIFICATE OF CORRECTION

PATENT NO. : 5,258,783

DATED : November 2, 1993

INVENTOR(S) : NOBUATSU SASANUMA, ET AL.

It is certified that error appears in the above-indentified patent and that said Letters Patent is hereby corrected as shown below:

<u>COLUMN 10</u>

Line 7, "steps of:" should read --steps of: ¶ --.
    Line 9, "and" should read --and ¶ --.

Signed and Sealed this

Twenty-third Day of August, 1994

Attest:

BRUCE LEHMAN

*Attesting Officer*  *Commissioner of Patents and Trademarks*